(12) United States Patent
Jin et al.

(10) Patent No.: US 12,129,759 B2
(45) Date of Patent: Oct. 29, 2024

(54) METHODOLOGY FOR DOWN SELECTION OF SURFACTANT FORMULATIONS

(71) Applicant: Alchemy Sciences, Inc., Houston, TX (US)

(72) Inventors: Luchao Jin, Houston, TX (US); Shashidhar Rajagopalan, Fulshear, TX (US); Erick Acosta, Sugar Land, TX (US)

(73) Assignee: Alchemy Sciences, Inc., Houston, TX (US)

( * ) Notice: Subject to any disclaimer, the term of this patent is extended or adjusted under 35 U.S.C. 154(b) by 324 days.

(21) Appl. No.: 17/834,334

(22) Filed: Jun. 7, 2022

(65) Prior Publication Data

US 2022/0397035 A1 Dec. 15, 2022

Related U.S. Application Data (60) Provisional application No. 63/210,371, filed on Jun. 14, 2021.

(51) Int. Cl.
| | |
|---|---|
| *E21B 43/16* | (2006.01) |
| *C09K 8/584* | (2006.01) |
| *E21B 49/00* | (2006.01) |
| *E21B 49/02* | (2006.01) |
| *E21B 49/08* | (2006.01) |

(52) U.S. Cl.
CPC .......... *E21B 49/0875* (2020.05); *C09K 8/584* (2013.01); *E21B 43/16* (2013.01); *E21B 49/005* (2013.01); *E21B 49/02* (2013.01)

(58) Field of Classification Search
CPC ................. E21B 43/16; C09K 8/584

USPC ..................................... 166/250.01
See application file for complete search history.

(56) References Cited

U.S. PATENT DOCUMENTS

| | | | | |
|---|---|---|---|---|
| 10,001,769 B2* | 6/2018 | Huang | ................. | E21B 43/267 |
| 10,241,100 B2* | 3/2019 | Xu | .................... | G01N 33/1826 |
| 11,155,747 B2* | 10/2021 | Allen | .................... | C08G 64/18 |
| 2015/0354352 A1* | 12/2015 | Ezzat | ................. | G01N 15/0826 |
| | | | | 73/152.05 |
| 2020/0308352 A1* | 10/2020 | Park | .......................... | C08J 3/24 |

* cited by examiner

*Primary Examiner* — William D Hutton, Jr.
*Assistant Examiner* — Ashish K Varma
(74) *Attorney, Agent, or Firm* — Ewing & Jones, PLLC (57) ABSTRACT

The method includes gathering field data of a formation, preparing samples of brine consistent with the composition of the formation brine and the injection brine, dead crude oil, and live crude oil, and characterizing the properties of crude oil samples. The method includes preparing samples of reservoir rock and characterizing the properties of the rock samples of the formation. The method includes measuring the contact angle of surfactant/formation brine/formation rock/formation crude oil samples at ambient and reservoir conditions and measuring the interfacial tension of the sample. The method includes characterizing the HLD properties of each surfactant. In addition, the method includes performing formulation targeting HLD=0 for a mixture of surfactants, performing laboratory evaluation of the HLD=0 formulation of the mixture of the surfactants to obtain values of oil recovery number, and testing the HLD=0 formulation of the mixture of the first and second selected surfactants in the formation.

42 Claims, 5 Drawing Sheets

METHODOLOGY FOR DOWN SELECTION OF SURFACTANT FORMULATIONS

CROSS-REFERENCE TO RELATED APPLICATIONS

This application is a nonprovisional application which claims priority from U.S. provisional application No. 63/210,371, filed Jun. 14, 2021, which is hereby incorporated by reference herein in its entirety.

FIELD

This disclosure relates generally to the field of treatment fluids used in improved oil recovery ("IOR") applications during hydrocarbon recovery.

BACKGROUND

Improved Oil Recovery methods target hydrocarbon resources not capable of being produced by primary production methods using the reservoir's internal energy or drive mechanism. Examples of IOR include well-stimulation, secondary recovery, and tertiary recovery. Well-stimulation is most often typified by hydraulic fracturing and matrix acidizing operations. In hydraulic fracturing, a fluid is injected at high pressure into a wellbore to create cracks in the formation. The fluid may include acids, thickening agents, corrosion inhibitors, biocides, scale inhibitors, surfactants and other chemicals. In acidizing, an acid is injected into a porous reservoir to dissolve residual drilling fluids and natural sediments in the well perforations and near-wellbore areas. In secondary recovery, water is injected into the reservoir to provide an external force to push hydrocarbons to the wellbore for extraction. In tertiary recovery methods fluids are injected into the reservoir as part of Enhanced Oil Recovery (EOR), which aids in crude oil production by supplying external reservoir energy plus modifying rock and fluid properties. Examples include thermal recovery, such as by steam injection, chemical injection, and gas injection to increase the oil mobility.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily reduced for clarity of discussion.

SUMMARY

A method is disclosed. The method includes gathering field data of a formation from a first location by collecting at least one of temperature and pressure of the formation, composition of the formation brine and the injection brine; live crude oil of the formation; dead crude oil of the formation, and rock samples of the formation. The method also includes preparing samples of brine consistent with the composition of the formation brine and the injection brine, dead crude oil, and live crude oil and characterizing the properties of the crude oil samples. In addition, the method includes preparing samples of reservoir rock and characterizing the properties of the rock samples of the formation. Further, the method includes measuring the contact angle of surfactant/formation brine/formation rock/formation crude oil samples at ambient and reservoir conditions and measuring the interfacial tension of surfactant/formation brine/ formation crude oil sample at ambient and reservoir conditions. The method includes selecting the first and the second surfactants and characterizing the HLD properties of the first selected surfactant and the second selected surfactant. In addition, the method includes performing formulation targeting HLD=0 for a mixture of first and a second selected surfactant and performing laboratory evaluation of the HLD=0 formulation of the mixture of the first and second selected surfactants to obtain values of oil recovery number. The method also includes testing the HLD=0 formulation of the mixture of the first and second selected surfactants in the formation.

DETAILED DESCRIPTION

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

This disclosure is not limited to the embodiments, versions, or examples described, which are included to enable a person having ordinary skill in the art to make and use the disclosed subject matter when the information contained herein is combined with existing information and technology.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations. For example, if the detailed description recites a range of from 1 to 5, that range includes all iterative ranges within that range including, for instance, 1.3-2.7 or 4.9-4.95.

The present disclosure describes a method for formulating an IOR surfactant using a combination of wettability and HLD-NAC (described below) while considering field conditions. By implementing the methods described below, new formulations of IOR surfactants may be tailored to maximize wettability reversal and optimize interfacial tension (IFT) in the subsurface hydrocarbon bearing formation.

Figure 1:
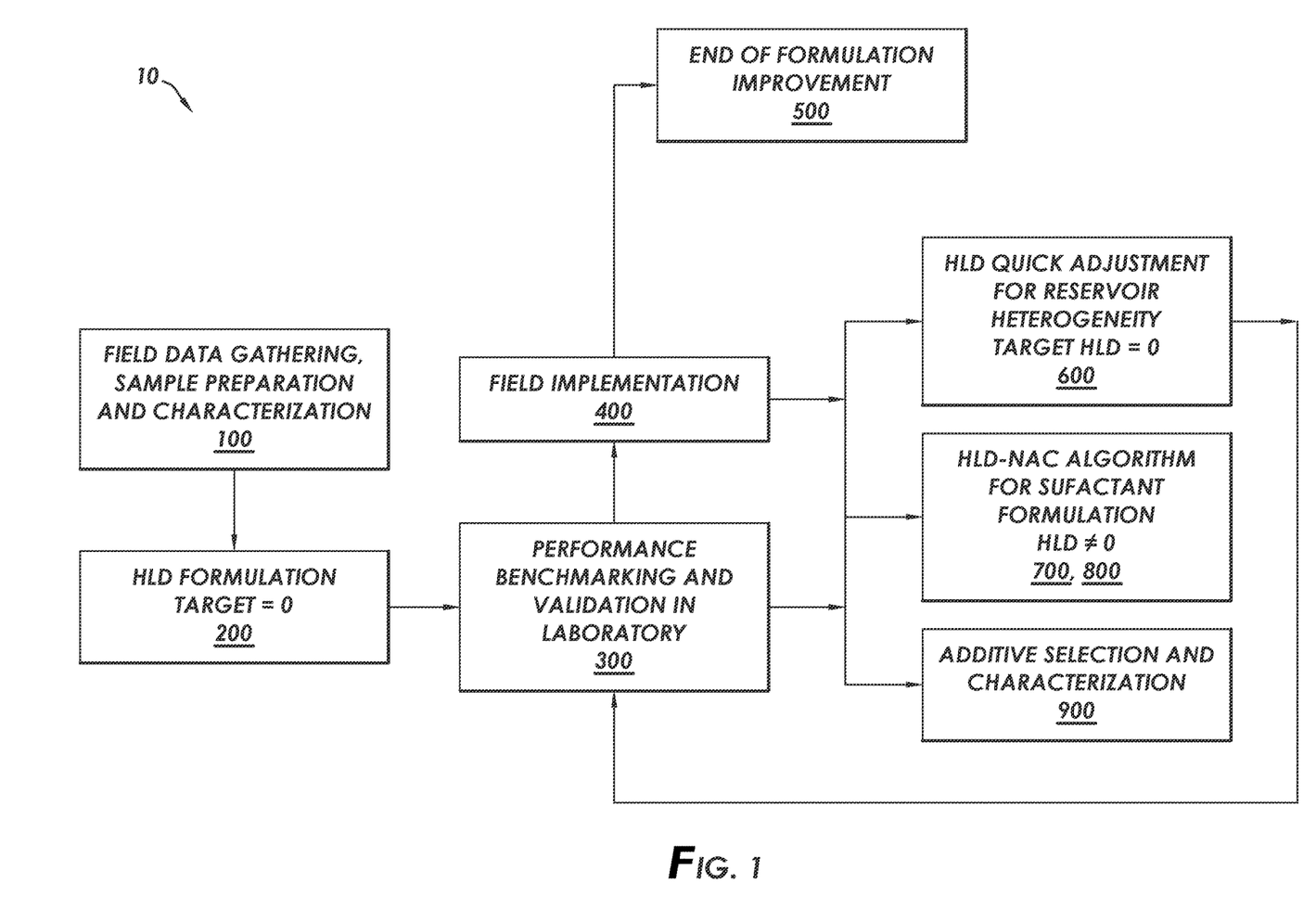
FIG. 1 is a flow diagram of an IOR Surfactant Formulation Process consistent with at least one embodiment of the present disclosure.

FIG. 1 depicts IOR surfactant formulation process 10 whereby surfactant based chemistries for IOR applications are developed and formulated, hereinafter "surfactant formulation." Surfactant formulation process 10 includes field data gathering, sample preparation & characterization 100.

Following field data gathering, sample preparation & characterization 100, HLD formulation target=0 200 is performed. The output of HLD formulation target=0 200 is used as input by performance benchmarking & validation in laboratory 300. Following performance benchmarking & validation in laboratory 300, field implementation 400 may be performed to evaluate the surfactant formulation in the field. Following field implementation 400, in certain embodiments, the surfactant formulation process may be ended in end of formulation improvement 500. In other embodiments, HLD quick adjustment for reservoir heterogeneity target HLD=0 600, HLD-NAC algorithm for surfactant formulation HLD≠0 700 & 800, or additive selection and characterization to boost performance in surfactant formulation 900 may be performed. In other embodiments, two or three of HLD quick adjustment for reservoir heterogeneity target HLD=0 600, HLD-NAC algorithm for surfactant formulation HLD≠0 700 & 800, and or additive selection and characterization to boost performance of surfactant formulation 900 may be performed. Following steps 600, 700 & 800, or 900, the surfactant formulation may be returned to performance benchmarking & validation in laboratory 300.

In field data gathering, sample preparation & characterization 100, formation temperature and pressure are determined, and brine, live & dead crude oil, and rock samples are prepared. In the preparation of the brine sample, the brine may be formulated to meet the characteristics of the brine to be used in the surfactant formulation. In the preparation of the crude oil sample, live oil and dead oil from the reservoir may be collected or live oil and dead oil from similar reservoirs may be collected. The live oil and dead oil samples may be conditioned, for example, by homogenizing the oil before sampling and testing. The dead oil sample may be combined with solution gas to generate a live oil sample. Further, the live oil and dead oil samples may be characterized by testing. Such tests may include equivalent alkane carbon number (EACN), SARA, total acid number (TAN), and total base number (TBN), among others. SARA testing is a method for characterization of crude oils based on fractionation, where a crude oil sample is separated into smaller quantities or fractions, with each fraction having a different composition. Fractionation is based on the solubility of hydrocarbon components in various solvents used in this test.

The type of rock sample prepared may depend in part on the IOR application. Examples of rock samples prepared may include reservoir cores, drilling cuttings, and outcrops. For reservoir cores, the cores sample may be cleaned and characterized. Subsequently, the reservoir core sample may be saturated with the oil sample described above and thermally aged. For drilling cuttings samples, the cuttings may be cleaned and characterized. Subsequently, the cuttings may be saturated with the oil sample described above and thermally aged. The cuttings may then be ground to a powder and formed into pellets or disks. For outcrop samples, the outcrop rock may be characterized, followed by saturation with the oil sample described above and thermally aged. In certain examples, characterization may include two- and three-dimensional characterization of rock samples using Scanning Electron Microscopy (2D SEM) and Focused Ion Beam Scanning Electron Microscopy (3D FIB-SEM) to determine the pore size distribution (PSD), the pore volume contribution, and the pore/microfracture connectivity of the rock sample. X-Ray Diffraction (XRD) and Quantitative Evaluation of Materials by Scanning Electron Microscopy (QEMSCAN) may be performed to qualitatively and quantitatively characterize the mineralogy and mineralogy distribution of the reservoir rock sample. Wettability may be characterized utilizing contact angle measurement at ambient or reservoir conditions with rock samples, and interfacial tension between aqueous and hydrocarbon phases may be measured at ambient or reservoir conditions with reservoir fluid samples.

HLD formulation target=0 200 may include two steps—surfactant down selection and HLD theory application. In surfactant down selection, at least two surfactants are selected for laboratory testing using the rock sample, crude oil sample and the brine. Wettability is characterized utilizing contact angle measurement at ambient or reservoir conditions with rock samples. In certain embodiments, surfactants may be ranked based on wettability alteration impact. Further, interfacial tension between aqueous and hydrocarbon phases is measured at ambient or reservoir conditions for the surfactants. In certain embodiments where more than two surfactants are evaluated in the surfactant selection step, the number of surfactants may be winnowed based on the results of in-situ wettability and in-situ interfacial tension.

In the HLD theory application step, the oil is characterized by obtaining EACN (equivalent alkane carbon number) values for homogenized crude oil. EACN of live oil can be calculated as $$EACN_{Live} = x_{dead}EACN_{dead} + x_{gas}EACN_{gas}$$

where subscript live, dead and gas represents live oil, dead oil and solution gas, respectively; x is the mole fraction of dead oil or solution gas in the live oil.

The surfactants are then characterized by obtaining HLD parameters for the surfactants as described herein below.

The HLD value for anionic surfactants can be calculated as $$HLD_{ai} = \ln(S) - K \times EACN - f(A) - \alpha_T \Delta T + Cc$$

The HLD value for nonionic surfactants can be calculated as $$HLD_i = b(S) - K \times EACN - \phi(A) + c_T \Delta T + Cc_n$$

where S is the concentration of the electrolyte (in g/100 ml), K is a constant that depends on surfactant head group and its hydrophilicity, EACN is the equivalent number of carbons in the alkane oil phase. The functions f(A) and φ (A) depend on the type and concentration of the cosurfactant added to the system; the value of these functions is zero if no cosurfactant is used. $\alpha_T$ and $c_T$ represent temperature factors of anionic and nonionic surfactants, respectively, and $\Delta T$ is $T - T_{ref}$, where T is the temperature of the reservoir and $T_{ref}$ is the reference temperature (25° C.). The parameter Cc is the characteristic curvature of the surfactant which reflects the hydrophilic/lipophilic nature of the surfactant. The value of the constant "b" is 0.13 for monovalent salts and 0.1 for divalent salts. The method to characterize the K and Cc value of conventional and extended surfactants are described by Witthayapanyanon, A., Harwell, J. H., & Sabatini, D. A. (2008), Hydrophilic-lipophilic deviation (HLD) method for characterizing conventional and extended surfactants, Journal of colloid and interface science, 325(1), 259-266. The method to obtain the f(A) and φ (A) of cosurfactants are described by Salager, J. L., Bourrel, M., Schechter, R. S., & Wade, W. H. (1979), Mixing rules for optimum phase-behavior formulations of surfactant/oil/water systems, Society of Petroleum Engineers Journal, 19(05), 271-278. And Hammond, C. E., & Acosta, E. J. (2012), On the characteristic curvature of alkyl-polypropylene oxide sulfate extended surfactants, Journal of Surfactants and Detergents, 15(2), 157-165, explained the method to obtain the temperature factors $\alpha_T$ and $C_T$.

For mixtures of similar surfactants (e.g., anionic-anionic or nonionic-nonionic mixtures), HLD may be combined using a linear mixing rule $$HLD_{mix} = X_1(HLD_1) + X_2(HLD_2)$$

where $X_1$ and $X_2$ are the molar fractions of surfactants 1 and 2 in the surfactant monolayer adsorbed at the oil-water interface, and typically equal to the molar fraction in the surfactant formulation considering that the monomer concentration of each of the surfactant in the excess oil and aqueous phase is relatively small.

For mixtures including both of anionic and nonionic surfactants, the linear mixing rule is adjusted as, $$HLD_{mix} = X_{ai}(HLD_{ai}) + X_{ni}(HLD_{ni}) + G_{EX}/RT$$

where the subindex "ai" represents the nonionic surfactant and "ni" represents the nonionic surfactant. The term $G_{EX}/RT$ represents the excess free energy-nonideality-normalized by RT, where R is the universal gas constant and T is temperature.

With characterized K, $\alpha_T$, and $c_T$ parameters, the HLD value of surfactant candidates at reservoir condition may be obtained. The individual HLD values are further applied in the equation to calculate $HLD_{mix}$. At $HLD_{mix}=0$, a low IFT surfactant system may be achieved. In certain embodiments, one surfactant candidate has a HLD value $\leq 0$ and the other candidate possesses a HLD value $\geq 0$ at the reservoir condition. By tuning the ratio of the two surfactant candidates, the molar ratio $X_1$ and $X_2$ are adjusted, so that an $HLD_{mix}=0$ is achieved. A combined surfactant formulation is formulated according to the surfactant ratio $X_1$ and $X_2$.

Once the combined surfactant formulation has been formulated, performance benchmarking & validation in laboratory 300 may be performed. In performance benchmarking & validation in laboratory 300, examples of laboratory testing include contact angle measurements at field temperature and pressure (such as, for instance, using the captive drop method), IFT measurements at field temperature (such as for instance, using the spinning drop tensiometer method), may be performed, as described in for instance, Mirchi, V., Saraji, S., Goual, L., & Piri, M. (2015), Dynamic interfacial tension and wettability of shale in the presence of surfactants at reservoir conditions, Fuel, 148, 127-138. In addition, oil recovery measurements may be performed, such as by rapid imbibition as described in US 2021-0405018, spontaneous imbibition (ambient and at high temperature/high pressure), core flooding, with and without imaging technologies such as x-ray tomography (micro-CT and nano-CT) or spectroscopic imaging such as nuclear magnetic resonance (NMR) and environmental transmission electron microscopy (ETEM).

Field implementation 400 may include implementation of the combined surfactant formulation to validate the performance of the combined surfactant formulation in incremental oil production, water-oil ratio, gas-oil-ratio, oil cut, and water cut at multiple well locations in the field for the target formation. Field implementation 400 may also include collecting data of oilfield formation temperature, salinity of injected and produced water, and crude oil properties, such as EACN, TAN, and/or TBN at multiple well locations in the field for the target formation. In certain embodiments, permanent or temporary sensors at wellsite may be used to perform direct sampling and direct or indirect data acquisition for further inference and sampling with offsite data acquisition at a lab. Further, data acquisition and sampling may occur during both injection and production phases of oil field operations. Data may be collected from multiple wells producing from the same homogeneous or heterogeneous formation.

Data from the performance benchmarking & validation in laboratory 300 and field implementation 400 may be used in HLD quick adjustment for reservoir heterogeneity target HLD=0 600, steps 700 & 800 HLD-NAC algorithm for surfactant formulation HLD≠0, and surfactant formulation 900.

In HLD quick adjustment for reservoir heterogeneity target HLD=0 600, the variations of reservoir live and dead crude oil properties, brine salinity and temperature heterogeneity across the formation from well to well are evaluated. The parameters of EACN (crude oil property), S (brine salinity) and ΔT (temperature) in the HLD equation are adjusted for each well. Therefore the molar ratio of each individual surfactant $X_1$ and $X_2$ are also adjusted to maintain the $HLD_{mix}$ equal to zero to accommodate for any heterogeneity.

Figure 2:
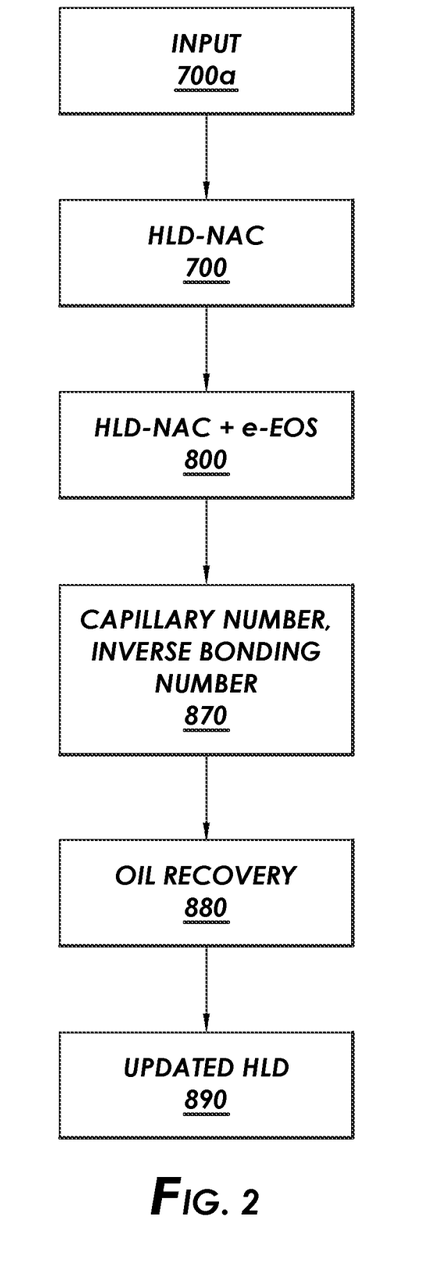
FIG. 2 is a flow diagram showing an HLD-NAC calculation+e-EOS consistent with at least some embodiments of the present disclosure.
Figure 3A:
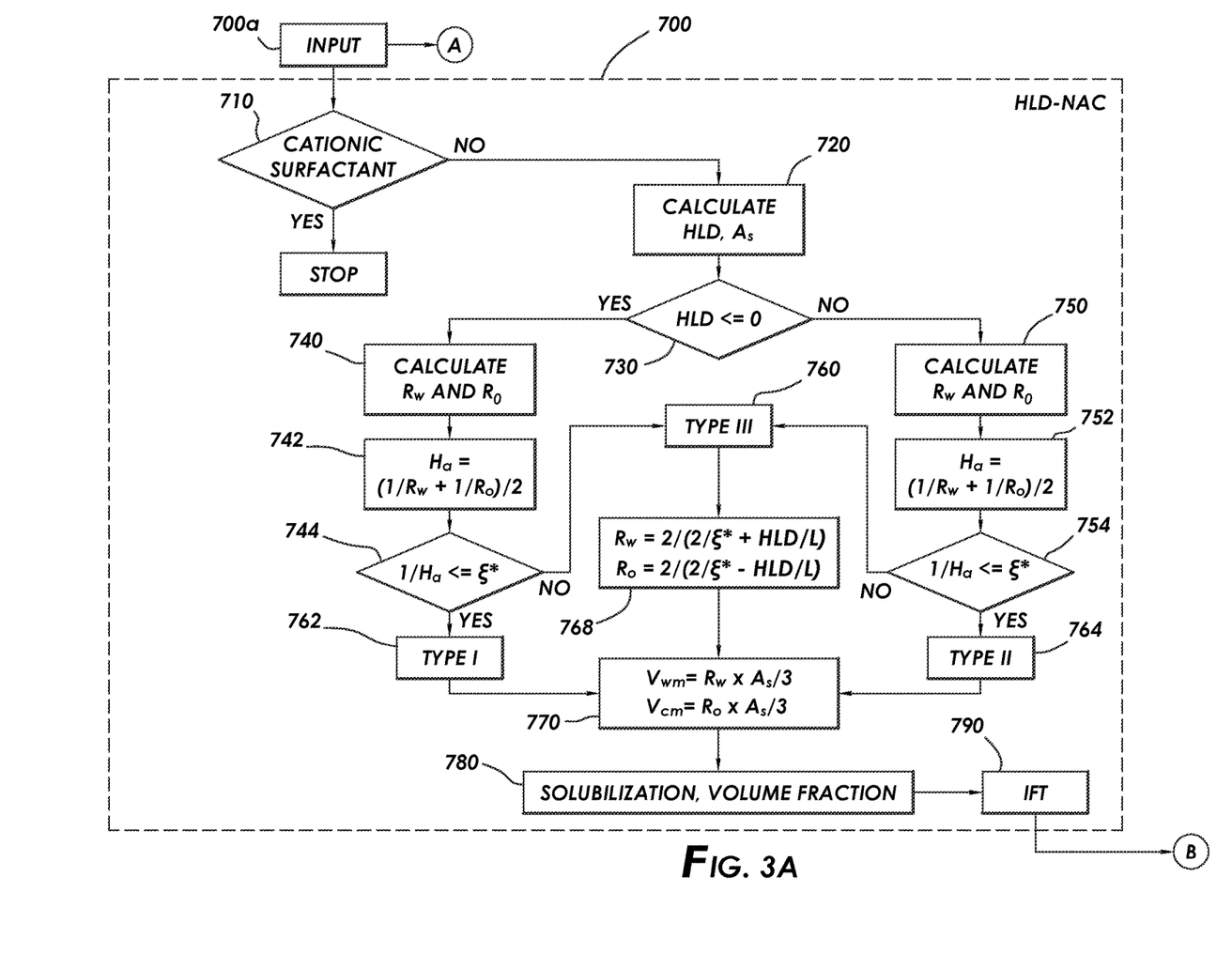
FIG. 3a is a flow diagram showing an HLD-NAC calculation+e-EOS consistent with at least some embodiments of the present disclosure.
Figure 3B:
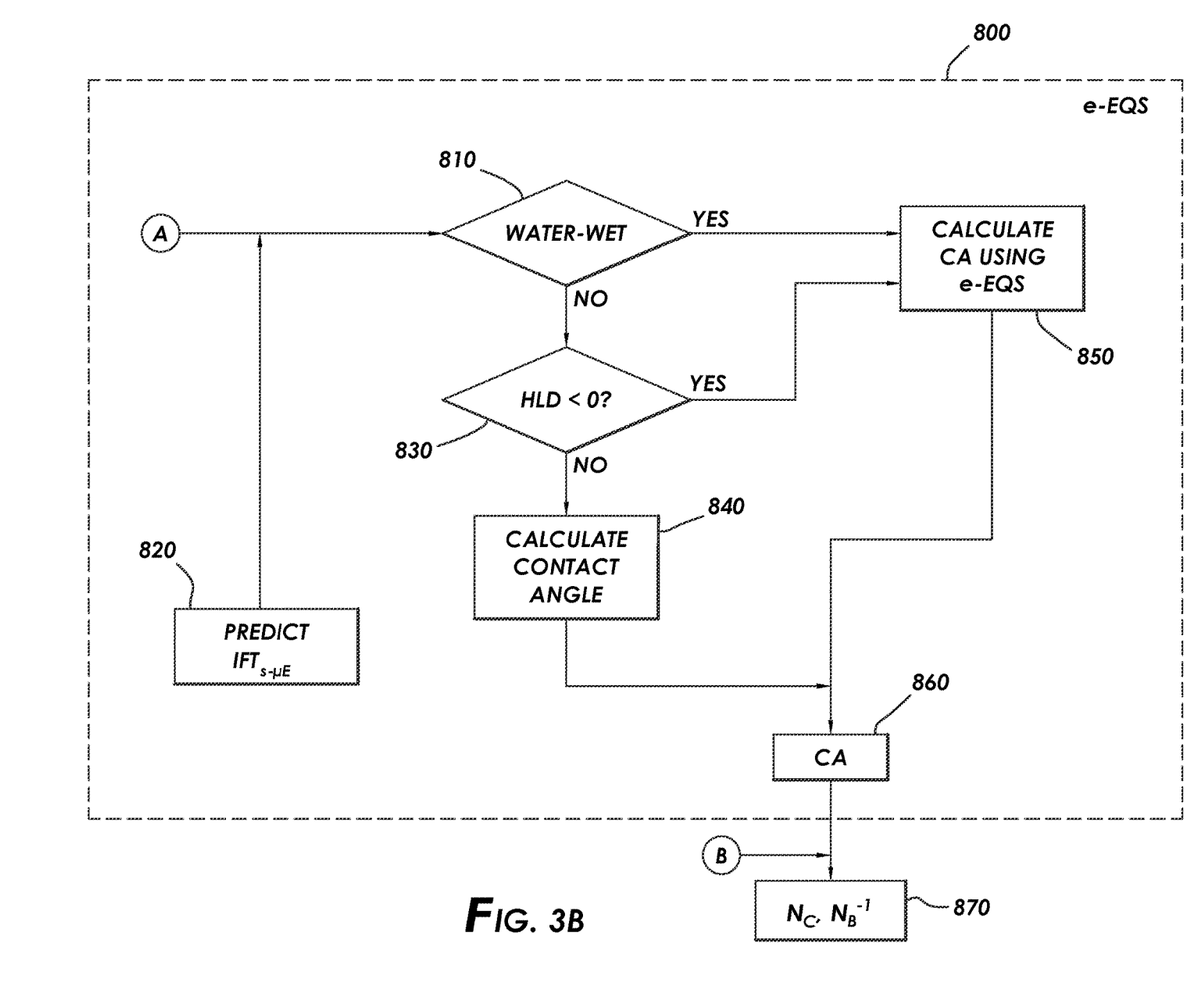
FIG. 3b is a flow diagram showing an HLD-NAC calculation+e-EOS consistent with at least some embodiments of the present disclosure.

As shown in FIGS. 2 and 3, in steps 700 & 800 HLD-NAC algorithm for surfactant formulation HLD≠0, HLD-NAC theory and the performance benchmarking and validation data from laboratory and field implementations may be used. As shown in FIG. 2, subsurface properties such as formation thickness, induced or natural fracture height, permeability and porosity may be used for input 700a. HLD=0 may not be ideal for counter-current imbibition or HLD=0 is not the most favorable for wettability reversal, which would reflect on contact angle and capillary number (Nc)+inverse bonding number ($N_B^{-1}$) framework (870), which eventually impact oil recovery (880). In this case, the formulation may be adjusted to an updated HLD (890).

Net-average curvature model for solubilization and supersolubilization in surfactant microemulsions, Langmuir, 19(1), 186-195 built a physics based hydrophilic lipophilic difference (HLD) Net-Average Curvature (NAC) called thereafter HLD-NAC microemulsion phase behavior model. This was further developed by Jin et al, (2016) Predicting Microemulsion Phase Behavior for Surfactant Flooding, SPE-179701-MS. Both of these documents are incorporated by reference in their entirety.

In HLD-NAC process 700, cationic surfactants are not applicable (710). HLD and $A_s$ are firstly calculated using the input in step 720.

Microemulsion, as used herein, refers to optically isotropic, thermodynamically stable, and clear dispersions formulated from oil, water and surfactants. The types of microemulsion correlates to the HLD value of the system. Values of HLD equal to zero means that the surfactant is equally soluble in oil and water, and it is also at this point that bi-continuous microemulsions (Type III or Type IV microemulsions) are obtained. A negative value of HLD means that the surfactant is preferentially soluble in water, and that oil in water (Type I) microemulsions are obtained. Positive HLD values are obtained for hydrophobic surfactant formulations that produce water in oil (Type II) microemulsions.

$A_s$ is the total interfacial area in a microemulsion (Å$^2$). $A_s$ is calculated from the equation:

$$A_s = \Sigma_i V_w \times C_{s_i} \times 6.023 \times 10^{23} \times \alpha_{si}$$

where:

$V_w$=the volume of water in the oil-water-surfactant system;

$C_{si}$, =the concentration of the surfactant species "i" in water, mol/L;

$a_{si}$; =the surface area per molecule of the surfactant, $Å^2$.

HLD is evaluated to determine if HLD less than or equal to zero (730). If so, $R_w$ and $R_o$ are calculated (740), wherein $R_o$ is the radius of hypothetical oil droplet in microemulsion (Å) and $R_w$ is the radius of hypothetical water droplet in microemulsion (Å). Where:

$$R_w = \frac{3 \times V_w}{A_s}$$

with $V_w$ being the volume of water and:

$$R_o = \frac{3 \times V_o}{A_s}$$

where $V_o$ being the volume of oil. The average curvature of (Å) ($H_a$) may be calculated (742) according to the equation:

$$H_a = (1/R_w + 1/R_o)/2$$

Subsequently, the characteristic length of a microemulsion system ($\xi^*$, Å) may be compared to $H_a$ (744) according to the equation:

$$1/H_a \leq \xi^*.$$

If the equation is true, then the microemulsion is a type I microemulsion (762). If not, the microemulsion is a type III microemulsion (760).

With reference to step 730, if HLD is greater than zero, then $R_w$ and $R_o$ are calculated (750), wherein $R_o$ is the radius of hypothetical oil droplet in microemulsion (Å) and $R_w$ is the radius of hypothetical water droplet in microemulsion (Å).

$$R_w = \frac{3 \times V_w}{A_s}$$

with $V_w$ being the volume of water and:

$$R_o = \frac{3 \times V_o}{A_s}$$

where $V_o$ being the volume of oil. The average curvature of (Å) ($H_a$) may be calculated (752) according to the equation:

$$H_a = (1/R_w + 1/R_o)/2$$

Subsequently, the characteristic length of a microemulsion system ($\xi^*$, Å) may be compared to $H_a$ (754) according to the equation:

$$1/H_a \leq \xi^*.$$

If the equation is true, then the microemulsion is a type II microemulsion (764). If not, the microemulsion is a type III microemulsion (760).

If the microemulsion is a type III microemulsion, $R_w$ and $R_o$ may be calculated (768) according to the equations:

$$R_w = 1/(2/\xi^*) + HLD/L$$

where L is the surfactant length parameter; and $$R_o = 1/(2/\xi^*) - HLD/L.$$

For all three types of microemulsions, the volume of oil in the microemulsion and the volume of water in the emulsion may be calculated as 770:

$$V_{wm} = R_w \times A_s/3$$

and $$V_{om} = R_o \times A_s/3.$$

Based on the volume of oil in the microemulsion and volume of water in the microemulsion, the solubilization ratio and the volume fraction may be calculated in step 780 as described in Jin et al. From the solubilization ratio and the volume fraction, IFT may be predicted in step 790 as described in Jin et al.

The impact of the HLD state of a surfactant system on the wettability of a rock surface is further evaluated by a combined HLD-NAC+e-EOS (800). Stammitti-Scarpone and Acosta, Solid-Liquid-Liquid Wettability of Surfactant-Oil-Water Systems and Its Prediction around the Phase Inversion Point, Langmuir, 2019, 35, 4305-4318 predicted solid-liquid-liquid contact angle at various HLD condition by implementing an extension of Neumann's equation of state (e-EOS).

The interfacial tension between solid and surfactant solution in water ($IFT_{s-\mu E}$) is predicted in step 820. It may be equal to ¼ of the interfacial tension between oil and water ($IFT_{O-W}$) at HLD=0 as described in Stammitti-Scarpone and Acosta. If the rock sample is originally water wet (810), the contact angle (CA) may be calculated using e-EQS (850) as described in Stammitti-Scarpone and Acosta, Solid-Liquid-Liquid Wettability of Surfactant-Oil-Water Systems and Its Prediction around the Phase Inversion Point, Langmuir, 2019, 35, 4305-4318. If the rock sample is not water wet, HLD is evaluated and if determined to be less than zero (830) then CA may be calculated using e-EQS. If HLD is equal to or greater than zero, the estimated contact angle equals to 180 minus the calculated contact angle using e-EQS (840). Contact angle (860) may then be determined.

Once IFT, and CA have been determined, capillary number ($N_C$) and inverse bonding number ($N_B^{-1}$) may be determined for the lab and reservoir conditions (870), using the following equation:

$$N_c = v\mu/\sigma \cos\theta$$

Where $v$ is the darcy velocity of the water phase in the pore networks, $\mu$ is the viscosity of the water phase, $\sigma$ is the interfacial tension between oil and water predicted from the HLD-NAC approach, and $\theta$ is the contact angle obtained from the HLD-NAC+e-EOS approach.

$$N_B^{-1} = \frac{C\sigma\sqrt{\phi/k}}{\Delta\rho g h}$$

Where C is a constant of 0.4, $\sigma$ is the interfacial tension between oil and water predicted from the HLD-NAC approach, $\phi$ is the porosity of the reservoir, k is the permeability of the reservoir, $\Delta\rho$ is the density differences between reservoir oil and reservoir water phases at the reservoir condition, g is the gravitational constant and h is the height of the fracture for the field condition and the length of the core plug for the lab condition.

For each reservoir with its associated rock and fluids, oil recovery is correlated to $N_C$ and $N_B^{-1}$. The correlations are obtained experimentally in step 870.

By tuning the input parameters of the surfactants and the surfactant ratio in step 700, an oil recovery at the step 880 can be estimated. The adjusted surfactant formulation can be obtained to achieve the highest oil recovery, and thereafter an updated HLD in step 890 is obtained.

Figure 4:
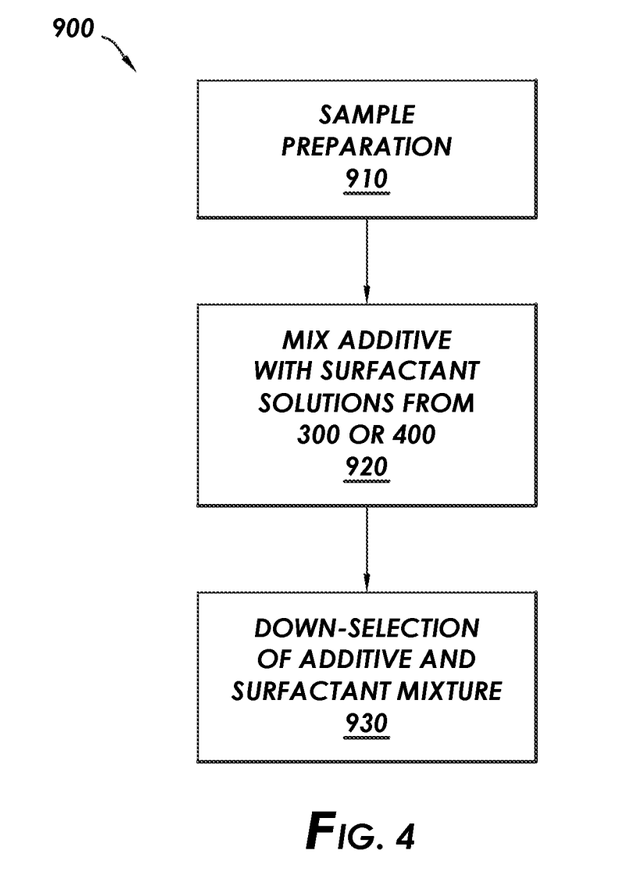
FIG. 4 is a flow diagram showing a product adjustment cycle consistent with certain embodiments of the present disclosure.

In surfactant formulation 900, the process begins with sample preparation (910), which includes preparing crude, brine and rock samples as described in step 100, and additive samples. The additives may include nano particles, acids, nanofluids, solvents, salts and ionic liquids.

Step 920 uses the prepared samples in step 910 to mix the additives with the surfactant solutions from step 400. Compatibility and stability analysis are conducted in this step. The compatibility and stability analysis may include sedimental test, dynamic light scattering, zeta potential measurement and SEM imaging. Stable and compatible mixtures are selected for down-selection of additive and surfactant mixture 930. The down selection tests may include in-situ contact angle measurement, in-situ interfacial tension measurement and adsorption measurement. In-situ contact angle measurement is conducted at reservoir conditions with rock samples. In certain embodiments, the additive and surfactant mixtures may be ranked based on wettability reversal impact. Further, in-situ interfacial tension between aqueous and hydrocarbon phases is measured at reservoir conditions for the additive and surfactant mixtures. Then, adsorption of the additive and surfactant mixture on the rock samples is measured using Quartz Crystal Microbalance with Dissipation (ACM-D) method. In certain embodiments where more than two mixtures of additive and surfactant mixtures are evaluated in the step 930, the number of additive and surfactant mixture may be winnowed based on the results of in-situ wettability, in situ interfacial tension and adsorption measurement.

After the adjustments are made to the surfactants, improved formulation may be achieved and performance benchmarking & validation in laboratory 300 is repeated.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A surfactant formulation process comprising:
    a. gathering field data of a formation from a first location by collecting at least one of temperature and pressure of the formation, composition of the formation brine and the injection brine; live crude oil of the formation; dead crude oil of the formation, and rock samples of the formation;
    b. preparing samples of brine consistent with the composition of the formation brine and the injection brine, dead crude oil, and live crude oil;
    c. characterizing the properties of the crude oil samples;
    d. preparing samples of reservoir rock;
    e. characterizing the properties of the rock samples of the formation;
    f. measuring the contact angle of surfactant/formation brine/formation rock/crude oil samples at ambient and reservoir conditions;
    g. measuring the interfacial tension of surfactant/formation brine/formation crude oil sample at ambient and reservoir conditions;
    h. selecting the first and the second surfactants;
    i. characterizing the hydrophilic-lipophilic deviation (HLD) properties of the first selected surfactant and the second selected surfactant;
    j. performing formulation targeting HLD=0 for a mixture of first and a second selected surfactant;
    k. performing laboratory evaluation of the HLD=0 formulation of the mixture of the first and second selected surfactants to obtain values of oil recovery number; and
    l. testing the HLD=0 formulation of the mixture of the first and second selected surfactants in the formation.

2. The method of claim 1 further comprising after step 1:
    m. gathering the field testing production results of claim 1, including incremental oil production, water-oil ratio, gas-oil-ratio, oil cut, and water cut;
    n. gathering field data of the formation from a second location by collecting at least one of temperature and pressure of the formation, composition of the formation brine and the injection brine; live crude oil of the formation; dead crude oil of the formation, and rock samples of the formation; and
    o. performing HLD quick adjustment for a second location target HLD=0 for a mixture of first and a second selected surfactant, using the characterized HLD properties of these surfactants in claim i, and gathered field data in claim n; or
    p. performing HLD-NAC+e-EOS process using the characterized HLD properties of these surfactants in claim 1, laboratory oil recovery evaluation results in step 1, gathered field testing production results of claim 1 and gathered field data in claim n; or
    q. formulating a composition including the first selected surfactant or the second selected surfactant and an additive.

3. The method of claim 2, wherein the step of performing HLD quick adjustment for reservoir heterogeneity target HLD=0 comprises:
    evaluating variations of reservoir live and dead crude oil properties, brine salinity and temperature heterogeneity across the formation from well to well.

4. The method of claim 2, wherein the step of performing HLD-NAC process comprises:
    calculating HLD and $A_s$, according to the equation:

$$A_s = \Sigma_i V_w \times C_{si} \times 6.023 \times 10^{23} \times a_{si}$$

wherein $V_w$=the volume of water in the system;
$C_{si}$=the concentration of the surfactant species "i" in water, mol/L; and
$a_{si}$=the surface area per molecule of the surfactant; $\text{Å}^2$.

5. The method of claim 4, wherein the step of performing HLD-NAC process comprises:
    determining if HLD is less than or equal to zero;
    if HLD is less than or equal to zero, $R_w$ and $R_o$ are calculated, wherein $R_o$ is the radius of hypothetical oil droplet in microemulsion (Å) and $R_w$ is the radius of hypothetical water droplet in microemulsion (Å); and $$R_w = \frac{3 \times V_w}{A_s}$$

with $V_w$ being the volume of water; and $$R_o = \frac{3 \times V_o}{A_s}$$

where $V_o$ being the volume of live oil or crude oil in the microemulsion.

6. The method of claim 5, where the average curvature of (Å) ($H_a$) may be calculated according to the equation:

$$H_a=(1/R_w+1/R_o)/2.$$

7. The method of claim 6, further comprising:
determining the characteristic length of a microemulsion system (Å); and
comparing ($\xi^*$) may to $H_a$ according to the equation:

$$1/H_a<=\xi^*.$$

8. The method of claim 7, wherein if $1/H_a<=\xi^*$ is true, designating the microemulsion a type II microemulsion.

9. The method of claim 7, wherein if $1/H_a<=\xi^*$ is false, designating the microemulsion a type III microemulsion.

10. The method of claim 9 further comprising:
calculating $R_w$ and $R_o$ may be calculated according to the equations:

$$R_w=1/(2/\xi^*)+HLD/L)$$

where L is the surfactant length parameter; and $$R_o=1/(2/\xi^*)-HLD/L).$$

11. The method of claim 7 further comprising determining a volume of oil in the microemulsion according to the equation:

$$V_{wm}=R_w \times A_s/3;\text{ and}$$

determining a volume of water in microemulsion according to the equation:

$$V_{om}=R_o \times A_s/3.$$

12. The method of claim 11 further comprising determining the solubilization ratio and the volume fraction.

13. The method of claim 12 further comprising determining IFT from the solubilization ratio and the volume fraction, determining IFT.

14. The method of claim 13, wherein the step of performing HLD-NAC+e-EOS process further comprises:
determining the IFT equal to ¼ of the interfacial tension between oil and water ($IFT_{O-W}$) at HLD=0.

15. The method of claim 14, wherein $N_C$ is calculated according to the equation:

$$N_c=v\mu/\sigma \cos \theta$$

where $v$ is the darcy velocity of the water phase in the pore networks, $\mu$ is the viscosity of the water phase, $\sigma$ is the IFT and $\theta$ is the contact angle.

16. The method of claim 15, wherein $N_B^{-1}$ is calculated according to the equation:

$$N_B^{-1} = \frac{C\sigma\sqrt{\phi/k}}{\Delta\rho g h}$$

where C is 0.4, $\sigma$ is the IFT, $\phi$ is the porosity of the reservoir, k is the permeability of the reservoir, $\Delta\rho$ is the density difference between reservoir oil and reservoir water phases at the reservoir condition, g is the gravitational constant and h is the height of a fracture or the length of a core plug.

17. The method of claim 16, wherein the step of formulating a third selected surfactant further comprises:
selecting the first selected surfactant or the second selected surfactant; and
combining the first selected surfactant or the second selected surfactant with an additive.

18. The method of claim 13 further comprising determining capillary number ($N_C$) and inverse bonding number ($N_B^{-1}$).

19. The method of claim 12 further comprising determining contact angle.

20. The method of claim 2, wherein the additive selection includes the preparation of additive samples.

21. The method of claim 20, wherein the additives are nano particles, acids, nanofluids, solvents, salts or ionic liquids.

22. The method of claim 21, wherein compatibility and stability analysis are performed on the surfactant formulation.

23. The method of claim 22, wherein the compatibility and stability analysis includes sedimental test, dynamic light scattering, zeta potential measurement or SEM imaging.

24. The method of claim 23, wherein the compatibility and stability analysis includes in-situ contact angle measurement, in-situ interfacial tension measurement or adsorption measurement.

25. The method of claim 24, wherein adsorption of the additive and surfactant mixture on the rock samples is measured using Quartz Crystal Microbalance with Dissipation (ACM-D) method.

26. The method of claim 1, wherein the live crude oil is prepared by combining dead oil with a solution gas.

27. The method of claim 1, wherein the dead crude oil sample is characterized by performing one or more of equivalent alkane carbon number (EACN), SARA, total acid number (TAN), and total base number (TBN).

28. The method of claim 1, wherein the rock sample is a reservoir core, drilling cutting, or outcrop rock.

29. The method of claim 28, wherein the cuttings may be saturated with the live oil, thermally aged, and ground into a powder.

30. The method of claim 28, wherein the cuttings may be saturated with the dead oil, thermally aged, and ground into a powder.

31. The method of claim 28, wherein the outcrop rock may be saturated with the live oil and thermally aged.

32. The method of claim 28, wherein the outcrop rock may be saturated with the dead oil and thermally aged.

33. The method of claim 1, wherein the step of characterize rock samples may be performed by two- and three-dimensional characterization of rock samples using Scanning Electron Microscopy (2D SEM) and Focused Ion Beam Scanning Electron Microscopy (3D FIB-SEM), X-Ray Diffraction (XRD) and Quantitative Evaluation of Materials by Scanning Electron Microscopy (QEMSCAN), contact angle measurement, or interfacial tension measurement.

34. The method of claim 1, wherein the step of perform target formulation HLD=0 for a first selected surfactant comprises:
surfactant selection; and
HLD theory application.

35. The method of claim 34, wherein surfactant selection comprises selecting the first selected surfactant and the second selected surfactant from at least three surfactant based on wettability alternation impact.

36. The method of claim 34, wherein the HLD theory application comprises characterizing the live oil by obtaining the EACN using the equation:

$$EACN_{Live} = x_{dead}EACN_{dead} + x_{gas}EACN_{gas}$$

where subscript live, dead and gas represents live oil, dead oil and solution gas, respectively; x is the mole fraction of dead oil or solution gas in the live oil.

37. The method of claim 34, wherein the HLD theory application comprises obtaining HLD parameters for the first and second selected surfactants, wherein the first and second selected surfactants are anionic surfactants, using the equation:

$$HLD_{ai} = \ln(S) - K \times EACN - f(A) - \alpha_T \Delta T + Cc$$

where S is the concentration of the electrolyte (in g/100 ml), K is a constant whose value depends on surfactant head group and its hydrophilicity, EACN is the equivalent number of carbons in an alkane oil phase, the function f(A) depend on the type and concentration of the cosurfactant added to the system;

wherein the value of this function is zero if no cosurfactant is used, $\alpha_T$ is a temperature factor of the anionic surfactant, respectively, and $\Delta T$ is $T - T_{ref}$, where T is the temperature of the formation and $T_{ref}$ is the reference temperature (25° C.), the parameter Cc is the characteristic curvature of the surfactant.

38. The method of claim 34, wherein the HLD theory application comprises obtaining HLD parameters for the first and second selected surfactants, wherein the first and second selected surfactants are nonionic surfactants, using the equation:

$$HLD_i = b(S) - K \times EACN - \phi(A) + c_T \Delta T + Cc_n$$

where S is the concentration of the electrolyte (in g/100 ml), K is the slope of the linear relationship of HLD equal to zero vs. different alkanes, EACN is the equivalent number of carbons in an alkane oil phase, the function $\phi(A)$ is the change of HLD value of the cosurfactant added to the system wherein the value of these functions is zero if no cosurfactant is used, $c_T$ is the temperature factor of the nonionic surfactant, respectively, $\Delta T$ is $T - T_{ref}$, where T is the temperature of the reservoir and $T_{ref}$ is the reference temperature (25° C.), the parameter Cc is the characteristic curvature of the surfactant and constant "b" is 0.13 for a monovalent salt and 0.1 for a divalent salt.

39. The method of claim 1, wherein the characterized HLD properties include K, Cc, $c_T$, $\alpha_T$, $f(A)$.

40. The method of claim 1, wherein the step of perform benchmarking and characterization of the first and second selected surfactant comprises measuring contact angle at field temperature and pressure, measuring IFT at a field temperature, measuring rapid imbibition, or measuring core flooding.

41. The method of claim 40, wherein the measurement of core flooding is performed by x-ray tomography or spectroscopic imaging.

42. The method of claim 1, wherein the step of testing the first and second selected surfactants in the formation comprises:

evaluating incremental oil production, water-oil ratio, gas-oil-ratio, oil cut, or water cut;

collecting data of the formation temperature, salinity of injected and produced water, and crude oil properties.

* * * * *

UNITED STATES PATENT AND TRADEMARK OFFICE
CERTIFICATE OF CORRECTION

| | |
|---|---|
| PATENT NO. | : 12,129,759 B2 |
| APPLICATION NO. | : 17/834334 |
| DATED | : October 29, 2024 |
| INVENTOR(S) | : Jin et al. |

It is certified that error appears in the above-identified patent and that said Letters Patent is hereby corrected as shown below:

In the Claims

Claim 2, Column 10, Lines 15-37:
"2. The method of claim 1 further comprising after step 1:
m. gathering the field testing production results of claim 1, including incremental oil production, water-oil ratio, gas-oil-ratio, oil cut, and water cut;
n. gathering field data of the formation from a second location by collecting at least one of temperature and pressure of the formation, composition of the formation brine and the injection brine; live crude oil of the formation; dead crude oil of the formation, and rock samples of the formation; and
o. performing HLD quick adjustment for a second location target HLD=0 for a mixture of first and a second selected surfactant, using the characterized HLD properties of these surfactants in claim i, and gathered field data in claim n; or
p. performing HLD-NAC+e-EOS process using the characterized HLD properties of these surfactants in claim 1, laboratory oil recovery evaluation results in step 1, gathered field testing production results of claim 1 and gathered field data in claim n; or
q. formulating a composition including the first selected surfactant or the second selected surfactant and an additive."

Should read:
"2. The method of claim 1 further comprising after step 1:
m. gathering the field testing production results of claim 1, including incremental oil production, water-oil ratio, Signed and Sealed this
Eleventh Day of February, 2025

Coke Morgan Stewart
*Acting Director of the United States Patent and Trademark Office* gas-oil-ratio, oil cut, and water cut;

n. gathering field data of the formation from a second location by collecting at least one of temperature and pressure of the formation, composition of the formation brine and the injection brine; live crude oil of the formation; dead crude oil of the formation, and rock samples of the formation; and o. performing HLD quick adjustment for a second location target HLD=0 for a mixture of first and a second selected surfactant, using the characterized HLD properties of these surfactants in claim 1, and gathered field data in step n; or p. performing HLD-NAC+e-EOS process using the characterized HLD properties of these surfactants in claim 1, laboratory oil recovery evaluation results in claim 1, gathered field testing production results of claim 1 and gathered field data in step n; or q. formulating a composition including the first selected surfactant or the second selected surfactant and an additive."